United States Patent
Nishida

(10) Patent No.: US 9,889,851 B2
(45) Date of Patent: Feb. 13, 2018

(54) CONTROL APPARATUS FOR VEHICLE

(71) Applicant: TOYOTA JIDOSHA KABUSHIKI KAISHA, Toyota-shi, Aichi-ken (JP)

(72) Inventor: Hideyuki Nishida, Shizuoka-ken (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 40 days.

(21) Appl. No.: 15/203,099

(22) Filed: Jul. 6, 2016

(65) Prior Publication Data

US 2017/0008527 A1    Jan. 12, 2017

(30) Foreign Application Priority Data

Jul. 8, 2015  (JP) .................................. 2015-137325

(51) Int. Cl.
*F02D 13/00*   (2006.01)
*B60W 30/18*   (2012.01)
(Continued)

(52) U.S. Cl.
CPC ......... *B60W 30/18072* (2013.01); *F02D 9/02* (2013.01); *F02D 13/0215* (2013.01); *F02D 13/0261* (2013.01); *F02D 13/06* (2013.01); *F02D 41/0002* (2013.01); *F02D 41/0005* (2013.01); *F02D 41/123* (2013.01); *F02D 41/3005* (2013.01); *B60W 2030/18081* (2013.01); *B60W 2510/0671* (2013.01); *B60Y 2300/18066* (2013.01); *B60Y 2300/18075* (2013.01); *B60Y 2300/46* (2013.01); *F02D 41/023* (2013.01); *F02D 41/08* (2013.01); *F02D 2009/0228* (2013.01); *F02D 2009/0235* (2013.01); *F02D 2011/101* (2013.01);
(Continued)

(58) Field of Classification Search
CPC .............. B60W 30/18072; F02D 13/04; F02D 13/0261; F02D 41/12; F02D 41/123; F02D 2041/002; F02D 13/00; F02D 13/02; F02D 13/0201
See application file for complete search history.

(56) References Cited

U.S. PATENT DOCUMENTS

| 5,927,252 A * | 7/1999 | Atsumi ............... F02D 13/0234 123/406.2 |
| 2016/0017825 A1* | 1/2016 | Maeda ................. F02D 41/022 701/58 |
| 2017/0009668 A1* | 1/2017 | Nishida ................... F02D 13/04 |

FOREIGN PATENT DOCUMENTS

| JP | 2011-012634 A | 1/2011 |
| JP | 2014-091398 A | 5/2014 |

* cited by examiner

*Primary Examiner* — Thomas Moulis
(74) *Attorney, Agent, or Firm* — Andrews Kurth Kenyon LLP

(57) ABSTRACT

A first control unit executes a valve stop inertial running including stopping an intake valve and an exhaust valve in a closed state during rotation of an output shaft, stopping supply of fuel to an engine, and setting a clutch in an engaged state to drive pistons of the engine by a rotational force from driving wheels. A second control unit executes a valve operation running including operating the intake valve and the exhaust valve during the rotation of the output shaft, and supplying the fuel to the engine based upon an intake conduit pressure. When a cancellation request is made during execution of the valve stop inertial running, a transient control unit operates the intake valve and the exhaust valve, and controls a throttle valve to an idling opening or less, thereby supplying a negative pressure to an intake passage.

5 Claims, 11 Drawing Sheets

| RUNNING MODE | | ENGINE 14 | CLUTCH C1 | ENGINE BRAKE FORCE | DECELERATION |
|---|---|---|---|---|---|
| VALVE OPERATION RUNNING | REGULAR ACCELERATION RUNNING | OPERATION | ENGAGED | - | - |
| | REGULAR DECELERATION RUNNING (ENGINE BRAKE RUNNING) | DRIVEN ROTATION | ENGAGED | LARGE | LARGE |
| TRANSIENT RUNNING | | F/C, DRIVEN ROTATION | ENGAGED | LARGE | LARGE |
| VALVE STOP INERTIAL RUNNING | | F/C, DRIVEN ROTATION, CYLINDER REST | ENGAGED | SMALL | SMALL |

(51) Int. Cl.
 *F02D 13/06* (2006.01)
 *F02D 9/02* (2006.01)
 *F02D 13/02* (2006.01)
 *F02D 41/30* (2006.01)
 *F02D 41/00* (2006.01)
 *F02D 41/12* (2006.01)
 F02D 11/10 (2006.01)
 F02D 41/02 (2006.01)
 F02D 41/08 (2006.01)

(52) U.S. Cl.
 CPC ............... *F02D 2041/002* (2013.01); *F02D 2200/0406* (2013.01); *F02D 2200/602* (2013.01); *Y02T 10/18* (2013.01); *Y02T 10/42* (2013.01); *Y02T 10/76* (2013.01)

| RUNNING MODE | | ENGINE 14 | CLUTCH C1 | ENGINE BRAKE FORCE | DECELERATION |
|---|---|---|---|---|---|
| VALVE OPERATION RUNNING | REGULAR ACCELERATION RUNNING | OPERATION | ENGAGED | - | - |
| | REGULAR DECELERATION RUNNING (ENGINE BRAKE RUNNING) | DRIVEN ROTATION | ENGAGED | LARGE | LARGE |
| TRANSIENT RUNNING | | F/C, DRIVEN ROTATION | ENGAGED | LARGE | LARGE |
| VALVE STOP INERTIAL RUNNING | | F/C, DRIVEN ROTATION, CYLINDER REST | ENGAGED | SMALL | SMALL |

FIG.2

CONTROL APPARATUS FOR VEHICLE

CROSS-REFERENCES TO RELATED APPLICATIONS

This application claims the benefit of Japanese Patent Application No. 2015-137325, filed Jul. 8, 2015, which is hereby incorporated by reference wherein in its entirety.

BACKGROUND OF THE INVENTION

Field of the Invention

The present invention relates to a control apparatus for a vehicle, and particularly, to an apparatus applied to an engine provided with a valve operation mechanism that can stop an intake valve and an exhaust valve in a closed state during rotation of an output shaft of the engine.

Description of the Related Art

There is well known a valve operation mechanism that can stop an intake valve and an exhaust valve in a closed state during rotation of an output shaft of an engine. In the engine provided with this type of valve operation mechanism, in a state of connecting the engine and driving wheels with engagement of a clutch, an operation of the intake valve and an operation of the exhaust valve of the engine are stopped in a closed state, making it possible to perform an inertial running of the vehicle without executing fuel supply to the associated cylinders in the engine (for example, Japanese Patent Laid-Open No. 2014-091398). This running mode is called "valve stop inertial running" as needed in the present specification.

During execution of the valve stop inertial running, the clutch in the power transmission route is made to be in a connecting state. Therefore, the output shaft of the engine and pistons connected thereto are driven by power transmitted from the driving wheels. In this valve stop inertial running, as compared with an inertial running in a state of no valve stop, a so-called pumping loss is reduced. Therefore, an engine brake force is reduced to increase a free running distance (that is, a running distance by inertia) and reduce opportunities of fuel resupply, making it possible to contribute to an improvement on fuel efficiency. Further, in a case where a hydraulic pressure by a mechanical oil pump driven by an engine is used in the other devices (automatic transmission or the like), the supply of the hydraulic pressure can continue regardless of the valve stopping.

In the valve stop inertial running, the piston is driven by a rotational force from the driving wheel side without use of a driving force generated in the piston. In contrast to this, a running mode of operating (i.e. activating) the intake valve and the exhaust valve during rotation of the output shaft of the engine (in other words, regular running) is called "valve operation running" as needed in the present specification.

SUMMARY OF THE INVENTION

During execution of the valve stop inertial running, even when a throttle valve is closed, air enters from a clearance in the periphery of the throttle valve, and a pressure in an intake passage downstream of the throttle valve is increased to an atmospheric pressure or the vicinity thereof. On the other hand, for avoiding misfiring to improve emissions, fuel supply control that supplies fuel of the amount in accordance with a pressure in the intake passage (intake conduit pressure) is widely executed.

Therefore, when the vehicle running mode returns back to the valve operation running from the valve stop inertial running, as the pressure in the intake passage is increased to the atmospheric pressure or the vicinity thereof, a large deal (amount larger than an idle equivalent amount) of fuel in accordance with the increased pressure is supplied by the aforementioned fuel supply control. As a result, excessive engine torque in response to an acceleration requirement through an accelerator pedal is rapidly generated to generate vibrations, possibly deteriorating drivability of a vehicle.

The present invention is made in view of the foregoing problems, and an object of the present invention is to suppress vibrations due to excessive engine torque when a vehicle running mode returns back to a valve operation running from a valve stop inertial running.

According to a first aspect of the present invention, a control apparatus for a vehicle configured to control a vehicle comprising a valve operation mechanism that can stop an intake valve and an exhaust valve in an engine in a closed state during rotation of an output shaft in the engine, and a clutch that can switch a power transmission route between the engine and a driving wheel between an engaged state and a disengaged state, comprising:

a first control unit configured to perform a valve stop inertial running including stopping the intake valve and the exhaust valve in the closed state during the rotation of the output shaft, stopping supply of fuel to the engine, controlling a throttle valve of the engine to an idling opening or less, and setting the clutch in the engaged state to drive pistons of the engine by a rotational force from the driving wheel through the output shaft;

a second control unit configured to perform a valve operation running including operating the intake valve and the exhaust valve during the rotation of the output shaft, and supplying the fuel to the engine; and a transient control unit configured to perform a transient running including operating the intake valve and the exhaust valve during the rotation of the output shaft, and controlling the throttle valve to the idling opening or less, thereby supplying a negative pressure to an intake passage section between the throttle valve and the intake valve, wherein the control apparatus is further configured so that in a case where a request for valve stop inertial running is made, the first control unit executes the valve stop inertial running, and in a case where a cancellation request is made during execution of the valve stop inertial running, the transient control unit executes the transient running, and thereafter, the second control unit executes the valve operation running.

According to the first aspect, the control apparatus, in a case where the cancellation request is made during execution of the valve stop inertial running, the transient control unit executes the transient running, and thereafter, the second control unit executes the valve operation running. As a result of executing the transient running, the negative pressure is supplied to the intake passage section between the throttle valve and the intake valve to lower the pressure in the intake passage section. As a result, at the start of the execution of the valve operation running, it is possible to supply the fuel of the suppressed amount in accordance with the suppressed pressure in the intake passage section to suppress vibrations due to excessive engine torque.

According to a second aspect of the present invention, the transient control unit is further configured to execute the transient running until the pressure in the intake passage section becomes lower than a predetermined reference pressure.

According to the second aspect, at the time the execution of the valve operation running is started, it is guaranteed that the pressure in the intake passage section is lower than the reference pressure. Therefore, the vibration due to the excessive engine torque can be suppressed.

According to a third aspect of the present invention, even in a case where the pressure in the intake passage section is not lower than the reference pressure during execution of the transient running, when an elapse time from the cancellation request exceeds a predetermined reference time, the second control unit executes the valve operation running.

According to the third aspect, it is possible to suppress a delay of the execution start of the valve operation running.

According to a fourth aspect of the present invention, the valve operation mechanism is configured to control operation timings of the intake valve and the exhaust valve, and the control apparatus is further configured to, during execution of the transient running, execute at least any of:
(1) making a valve overlap amount, in which the intake valve and the exhaust valve are both open, to be smaller than a valve overlap amount determined based upon a required load and an engine rotational speed;
(2) making an opening timing of the intake valve closer to an exhaust top dead center as compared with an opening timing of the intake valve determined based upon a required load and an engine rotational speed;
(3) making a closing timing of the intake valve closer to an exhaust bottom dead center as compared with a closing timing of the intake valve determined based upon a required load and an engine rotational speed; and
(4) making a closing timing of the exhaust valve closer to an exhaust top dead center as compared with a closing timing of the exhaust valve determined based upon a required load and an engine rotational speed.

According to the forth aspect, it is possible to accelerate a reduction in pressure in the intake passage section during execution of the transient running.

According to a fifth aspect of the present invention, the control apparatus is further configured to execute guard processing such that a changing amount per time of an opening of the throttle valve in the engine is made smaller than a predetermined threshold after starting the valve operation running.

According to the fifth aspect, even in a case where a rapid operation of an accelerator pedal by a driver is executed, it is possible to suppress the vibration due to the excessive engine torque.

Further features of the present invention will become apparent from the following description of exemplary embodiments (with reference to the attached drawings).

BRIEF DESCRIPTION OF THE DRAWINGS

FIG. 2 is a diagram explaining a content of three running modes to be executed in the vehicle in FIG. 1;

DESCRIPTION OF THE EMBODIMENTS

Hereinafter, an explanation will be in detail made of embodiments of the present invention with reference to the accompanying drawings.

Figure 1:
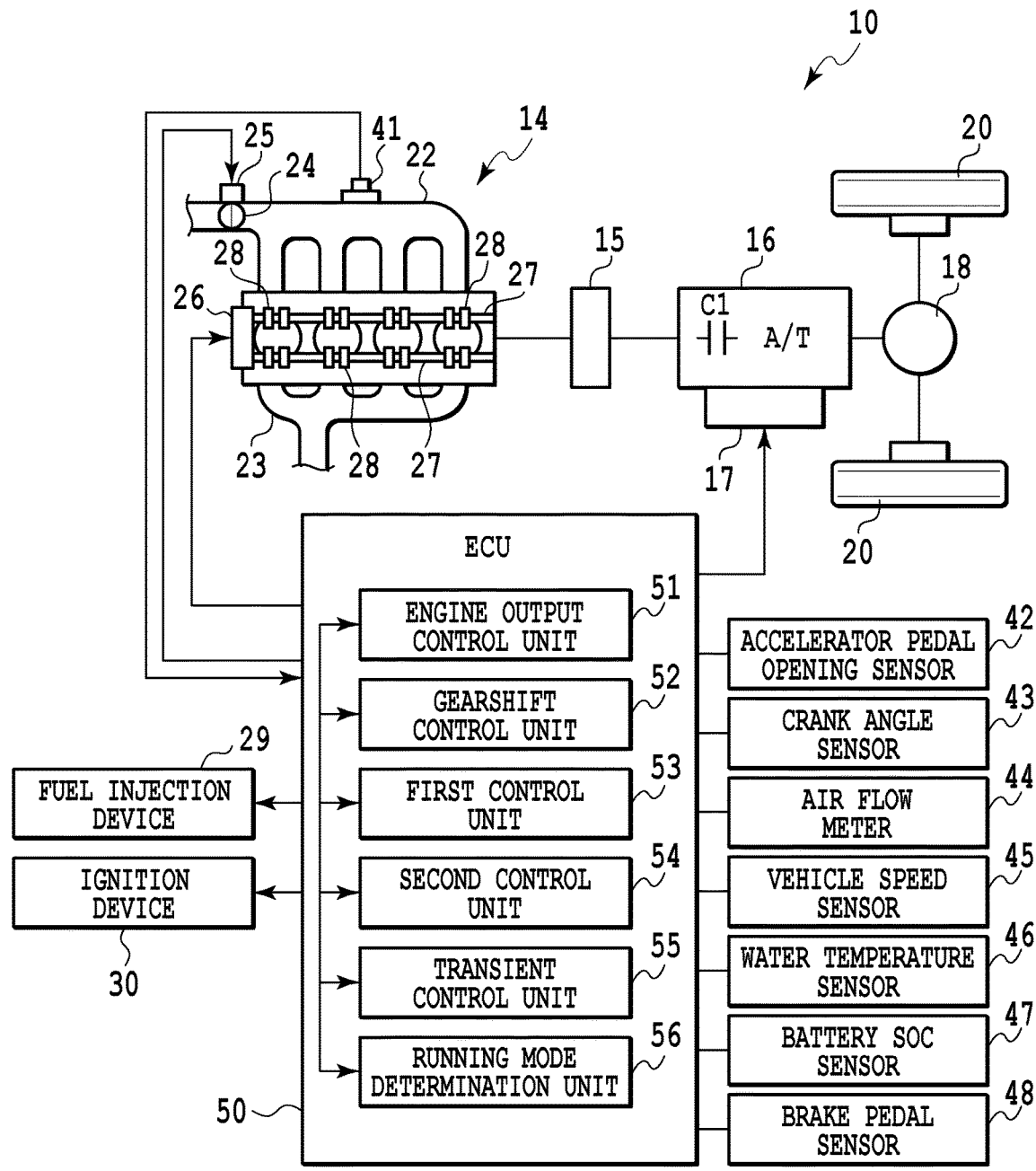
FIG. 1 is a functional block diagram illustrating the schematic configuration of a vehicle according to a first embodiment of the present invention.

FIG. 1 is a functional block diagram illustrating the schematic configuration of a vehicle 10 according to a first embodiment of the present invention. In FIG. 1, the vehicle 10 includes an engine 14 having a plurality of cylinders, and an automatic transmission 16. Power of the engine 10 as a driving power source is transmitted to left and right driving wheels 20 through the automatic transmission 16 and a differential gear device 18. A power transmission device 15 such as a damper device and a torque converter is provided between the engine 14 and the automatic transmission 16. A motor generator operable as the driving power source may be additionally provided between the engine 14 and the automatic transmission 16.

The engine 14 is an internal combustion engine that generates power by combustion of fuel. The engine 14 is a gasoline engine of an in-line four-cylinder, but the number of cylinders in the engine 14 may be set to any number, and the engine 14 may use fuel of a different kind like a diesel engine. An intake manifold 22 is connected to intake ports of the engine 14. An exhaust manifold 23 is connected to exhaust ports of the engine 14.

A throttle valve 24 is installed upstream of a branch portion of the intake manifold 22 in the intake passage. The throttle valve 24 is a butterfly valve, and is driven by a throttle actuator 25, such as a DC servo motor or a stepping motor. The intake passage upstream of the throttle valve 24 is open to outside air through a not shown air cleaner. The downstream side of the exhaust manifold 23 is open to outside air through catalyst devices and a muffler both not shown.

The engine 14 is provided with a variable valve mechanism 26 that can stop the intake valve and the exhaust valve in a closed state. The variable valve mechanism 26 can separate all of the intake and exhaust valves in a plurality of cylinders from a crank shaft mechanically and stop them. Therefore, a pumping loss at the time the engine 14 is driven-rotated at fuel cutting (F/C) is reduced to be smaller as compared with that in the inertial running without valve stopping, thus making it possible to reduce the engine brake force and increase the free running distance.

The variable valve mechanism 26 is provided with a valve stop mechanism, a valve timing variable mechanism and a lift amount variable mechanism. The valve stop mechanism is provided with cam lobe members 28 that project/retreat radially from cam base members disposed integrally with cam shafts 27, and is configured to be capable of controlling the cam lobe member 28 in a two-step manner of a projecting state and a retreating (retracted) state by a hydraulic or electromagnetic actuator. At the projecting state, respective lift amount for regular running act on the intake valve and the exhaust valve. At the retreating state, a lift amount of each of the intake valve and the exhaust valve becomes zero, and thereby the intake valve and the exhaust valve are stopped in the closed state during rotation of a crank shaft (not shown) in the engine 14. The detailed configuration of the variable valve mechanism may be made as the same as one disclosed in Japanese Patent Laid-Open No. 2014-181645, for example. It should be noted that an example of the valve stop mechanism may include any other type that can stop an intake valve and an exhaust valve in a closed state. The valve stop mechanism of such other type includes, for example, (i) a mechanism in which two kinds of cam lobe members with and without a lift fixed to a camshaft respectively abut on rocker arms and the two rocker arms are connected to or disconnected from each other, and (ii) a mechanism in which the cam shaft is moved axially to select one of the two kinds of the cam lobe members with and without the lift as needed, but is not limited thereto. In the valve stop mechanism, even when the intake valve and the exhaust valve are stopped in the closed state, the cam shaft 27 rotates in a speed in synchronization with the crank shaft of the engine 14. A not shown oil pump is fixed also to the cam shaft 27, and when the cam shaft 27 rotates, a hydraulic pressure is supplied to a hydraulic device of each component in a vehicle including a hydraulic control device 17 to be described later.

The valve timing variable mechanism has a hydraulic chamber fixed to a driven gear and a vane portion fixed to an end portion of the cam shaft, and holds the vane portion to be rotatable in the hydraulic chamber. The valve timing variable mechanism causes the hydraulic pressure to selectively act on an advance angle chamber and a delay angle chamber formed by the vane portion to rotate the vane portion, making it possible to continuously vary a phase of the cam shaft. This type of valve timing variable mechanism is well known, and the detailed configuration may be made as the same as one disclosed in Japanese Patent Laid-Open No. 2010-203372, for example.

The lift amount variable mechanism has a roller arm abutting on the cam shaft and a pivotal cam abutting on a rocker arm, and an angle between the roller arm and the pivotal cam is controlled by an electrical motor, thus making it possible to continuously vary a lift amount of each of an intake valve and an exhaust valve. This type of lift amount variable mechanism is well known, and the detailed configuration may be made as the same as one disclosed in Japanese Patent Laid-Open No. 2010-180865, for example.

The engine 14 is provided with a fuel injection device 29. The fuel injection device 29 includes fuel injection valves installed in the respective cylinders one by one and a drive circuit for controlling a fuel injection quantity from the fuel injection valve. Each of the fuel injection valves is installed for injecting fuel into a combustion chamber of each of the cylinders, but may be provided to inject fuel to each of intake ports. The engine 14 is also provided with an ignition device 30. The ignition device 30 includes ignition plugs installed in the respective cylinders one by one and a drive circuit for controlling power to the ignition plugs.

The automatic transmission 16 is a stepped automatic transmission of a planetary gear type. In the automatic transmission 16, a plurality of gear speeds having gear ratios different from each other are established depending upon an engaged/disengaged state of a plurality of hydraulic friction engaging devices (clutches and brakes). The automatic transmission 16 is controlled by a hydraulic control device 17. In the automatic transmission 16, a predetermined gear shift position is established according to an operating condition including an operation of an accelerator pedal by a driver and a vehicle speed when the hydraulic friction engaging devices are respectively controlled to be engaged/disengaged by electromagnetic hydraulic control valves and electromagnetic switching valves provided in the hydraulic control device 17. An example of the automatic transmission 16 may include the other type of stepped transmissions or continuously variable transmissions.

A clutch C1 acting as an input clutch of the automatic transmission 16 is provided inside of the automatic transmission 16. The clutch C1 is a hydraulic friction engaging device, and is controlled by the hydraulic control device 17. The clutch C1 can switch the power transmission route between the engine 40 and the driving wheels 20 to an engaged state or a disengaged state. Supply of hydraulic pressures to the hydraulic control device 17 is executed by a mechanical oil pump (not shown) to be driven by the engine 14.

An intake pressure sensor 41 is installed in the intake manifold 22 to detect a pressure in the intake passage section between the throttle valve 24 and the intake valve. An accelerator pedal opening sensor 42 is installed in the vicinity of a not shown accelerator pedal to detect a depressing amount of the accelerator pedal. A crank angle sensor 43 is installed in the vicinity of the not shown crank shaft of the engine 14 to detect a rotational speed of the crank shaft. An air flow meter 44 is installed in the intake passage upstream of the throttle valve 24 to detect an intake air quantity. A vehicle speed sensor 45 is installed in the vicinity of each driving wheel 20 to detect a vehicle speed. A water temperature sensor 46 is installed in a cooling water passage of the engine 14 to detect a cooling water temperature. An SOC (state of charge) sensor 47 is installed in a not shown battery to detect an SOC of the battery. A brake pedal sensor 48 is installed in the vicinity of a brake pedal 31 to detect a depressing pressure of the brake pedal.

The vehicle 10 is provided with an electronic control unit (ECU) 50 configured to execute control of the vehicle 10 in association with the engine 14 and the automatic transmission 16. The ECU 50 is configured to execute output control of the engine 14 and gearshift control of the automatic transmission 16. The ECU 50 is configured to include a well-known microcomputer provided with a CPU, a RAM, a ROM, an input interface, and an output interface. The CPU uses a temporary memory function of the RAM and executes signal processing according to programs preliminarily stored in the ROM, thus executing various types of control in the vehicle 10.

Various kinds of sensors including the intake pressure sensor 41, the accelerator pedal opening sensor 42, the crank angle sensor 43, the air flow meter 44, the vehicle speed sensor 45, the water temperature sensor 46, the SOC sensor 47 and the brake pedal sensor 48 as described above are connected to the input interface of the ECU 50, and signals from the various kinds of the sensors are input thereto.

Various kinds of actuators including the hydraulic control device 17, the throttle actuator 25, the variable valve mechanism 26, the fuel injection device 29 and the ignition device 30 as described above are connected to the output interface of the ECU 50, and signals to the various kinds of the actuators are output thereto.

The ECU 50 operably includes an engine output unit 51, a gearshift control unit 52, a first control unit 53, a second control unit 54, a transient control unit 55 and a running mode determination unit 56.

The engine output control unit 51, for example, for obtaining a required output by a driver, controls opening/ closing of the throttle valve 24, controls a fuel injection quantity by the fuel injection device 29, and controls an ignition timing by the ignition device 30. Specifically, the engine output control unit 51 calculates, for example, a target value of each of a throttle opening, a fuel injection quantity and an ignition timing based upon a depressing amount of the accelerator pedal detected by the accelerator pedal opening sensor 42, a vehicle speed detected by the vehicle speed sensor 45, the present gear shift position of the automatic transmission 16 and an intake conduit pressure detected by the intake pressure sensor 41 to obtain the required output. In addition, the engine output control unit 51 controls the throttle valve 24, the fuel injection device 29 and the ignition device 30 according to these target values. Particularly, the fuel injection quantity by the fuel injection device 29 is set to the amount in accordance with the intake conduit pressure for avoiding misfiring to improve emissions. The intake conduit pressure uses a detection value of the intake pressure sensor 41, and besides, may be estimated based upon, for example, a detection value of the air flowmeter 44, a throttle opening, an engine rotational speed, a valve timing and a valve opening. In this fuel injection control, a fuel injection quantity can be set based upon a parameter correlative to an intake conduit pressure. An example of such a parameter may include an intake air quantity instead of the intake conduit pressure. On the other hand, when necessary, the engine output control unit 51 can stop fuel supply from the fuel injection device 29 (fuel cut).

In addition, the engine output control unit 51 controls an idle speed control valve (not shown) provided in a bypass passage bypassing the throttle valve 24, thus making it possible to execute idle speed control that suppresses fluctuations of an engine rotational speed due to load fluctuations by auxiliary devices at idling.

The gearshift control unit 52 executes the gearshift control of the automatic transmission 16. Specifically, the gearshift control unit 52 executes a gearshift determination based upon, for example, a depressing amount of the accelerator pedal detected by the accelerator pedal opening sensor 42 and a vehicle speed detected by the vehicle speed sensor 45. The gearshift control unit 52, in a case where it is determined that the gearshift of the automatic transmission 16 should be executed, outputs a hydraulic command signal for engaging and/or disengaging the hydraulic friction engaging device involved in the gearshift of the automatic transmission 16 to the hydraulic control device 17 to achieve the determined gear shift position. On the other hand, in a case where there is a request for valve stop inertial running, a request for valve operation running or a request for transient running, the gearshift control unit 52 can make the clutch C1 in the engaged state.

The first control unit 53, the second control unit 54 and the transient control unit 55 perform respectively three kinds of running modes made up of the valve stop inertial running, the valve operation running and the transient running illustrated in FIG. 2.

The first control unit 53 stops operations of all the cylinders in the engine 14 in a state where the engine 14 and the driving wheels 20 are connected, through the engine output control unit 51 and the gearshift control unit 52, to execute the valve stop inertial running for vehicle inertial running. In the valve stop inertial running, the gearshift control unit 52 maintains the engaged state of the clutch C1 to connect the engine 14 and the driving wheels 20, and the engine output control unit 51 stops the fuel supply to the engine 14 (fuel cut). In addition, in the valve stop inertial running, the ECU 50 stops the operations of the intake valves and the exhaust valves in all the cylinders of the engine 14 in positions where all of the valves are in the closed state, by the variable valve mechanism 26. At this time, the crank shaft is driven-rotated in accordance with a vehicle speed or a gear shift position of the automatic transmission 16. However, since the intake/exhaust valves are stopped in the closed state, as compared with a case where the intake/exhaust valves are opened/closed in synchronization with the crank shaft, a loss by a pumping function is made smaller, and an engine brake force is reduced to be smaller than in a regular deceleration running (engine brake running). As a result, as compared with the valve operation running, a free running distance becomes longer to improve the fuel efficiency. In addition, even during the valve stopping, the supply of the hydraulic pressure to the hydraulic control device 17 can continue by the mechanical oil pump (not shown) driven by the engine 14. Further, the valve stop suppresses supply of oxygen to a catalyst device, making it possible to suppress a reduction in purification capability.

During the valve stop inertial running, the aforementioned idle speed control is cancelled, and the throttle valve 24 is controlled to be fully closed, that is, to the minimum opening as a mechanical limit. However, even during the valve stop inertial running, the idle speed control may be executed to control the throttle valve 24 to the idle opening or less in accordance with a load of the auxiliary devices.

The second control unit 54 executes the valve operation running that operates the intake valve and the exhaust valve during rotation of the crank shaft, through the engine output control unit 51 and the gearshift control unit 52. In the valve operation running, the ECU 50 operates the intake valve and the exhaust valve during the rotation of the crank shaft, in a state where the engine 14 and the driving wheels 20 are connected (that is, in a state where the clutch C1 is engaged). The valve operation running includes a regular acceleration running in which the engine 14 is in a driving state, and a regular deceleration running (engine brake running) in which the engine 14 is in a driven state.

In the regular acceleration running, the engine output control unit 51, as described above, executes the output control of the engine 14 to obtain the required output from a driver. The gearshift control unit 52 executes the gearshift control of the automatic transmission 16 including the engagement of the clutch C1 based upon the vehicle speed and the required output.

In the regular deceleration running (engine brake running), the engine output control unit 51 and the gearshift control unit 52 driven-rotates the engine 14 in a state where the engine 14 and the driving wheels 20 are connected, thus executing the vehicle running with effect of engine braking. The regular deceleration running is executed, for example, at the time the accelerator pedal is released. In the regular deceleration running, an engine brake force is generated by a rotation resistance consisting of a pumping loss, friction torque or the like by the driven rotation of the engine 14. In the regular deceleration running, the idle speed control is executed, and an opening of the throttle valve 24 is made to an idle opening in accordance with loads of auxiliary devices. A fuel injection quantity of the fuel injection device 29 is made to a predetermined quantity (minimum quantity) similarly to an idle state. In the automatic transmission 16, a predetermined gearshift position is established in accordance with a vehicle speed or the like and the clutch C1 is held in an engaged state. As a result, the engine 14 is driven-rotated in a predetermined rotational speed defined in accordance with a vehicle speed and a gearshift ratio to generate an engine brake force in accordance with the rotational speed.

The transient control unit 55 executes the transient running through the engine output control unit 51 and the gearshift control unit 52. The transient running operates the intake valve and the exhaust valve during the rotation of the crank shaft, and controls the throttle valve 24 to an idling opening or less, thereby supplying the negative pressure to the intake passage section between the throttle valve 24 and the intake valve. In this transient running, the gearshift control unit 52 maintains the engaged state of the clutch C1 to connect the engine 14 and the driving wheels 20, and the engine output control unit 51 stops the fuel supply to the engine 14 (fuel cut). The automatic transmission 16 establishes a predetermined gear shift position in accordance with a vehicle speed or the like. Therefore, the engine 14 is driven-rotated in a predetermined rotational speed determined in accordance with a vehicle speed and a gear ratio to operate pistons. Since the intake valve and the exhaust valve operate in this state, the negative pressure is supplied to the intake passage section between the throttle valve 24 and the intake valve. During the transient running, the aforementioned idle speed control is cancelled, and the throttle valve 24 is controlled to a fully closed state, that is, a minimum opening as a mechanical limit.

The running mode determination unit 56 determines which mode of three kinds of running modes composed of the valve stop inertial running, the valve operation running (regular acceleration running, regular deceleration running) and the transient running is selected, and switches the running mode to the determined running mode. Specifically, the running mode determination unit 56 basically determines execution of the regular acceleration running, for example, at accelerator pedal depressing when a depressing amount of the accelerator pedal is not determined to be zero. In addition, the running mode determination unit 56 basically determines execution of the regular deceleration running, for example, when the accelerator pedal is released and a brake operating force is larger than a predetermined brake operating force. On the other hand, the running mode determination unit 56 basically determines execution of the valve stop inertial running, for example, in a case where the accelerator pedal and the brake pedal both are released. In a case where the cancellation request is made during execution of the valve stop inertial running, the execution of the transient running is determined, and after the execution, the execution of the valve operation running is determined.

Figure 3:
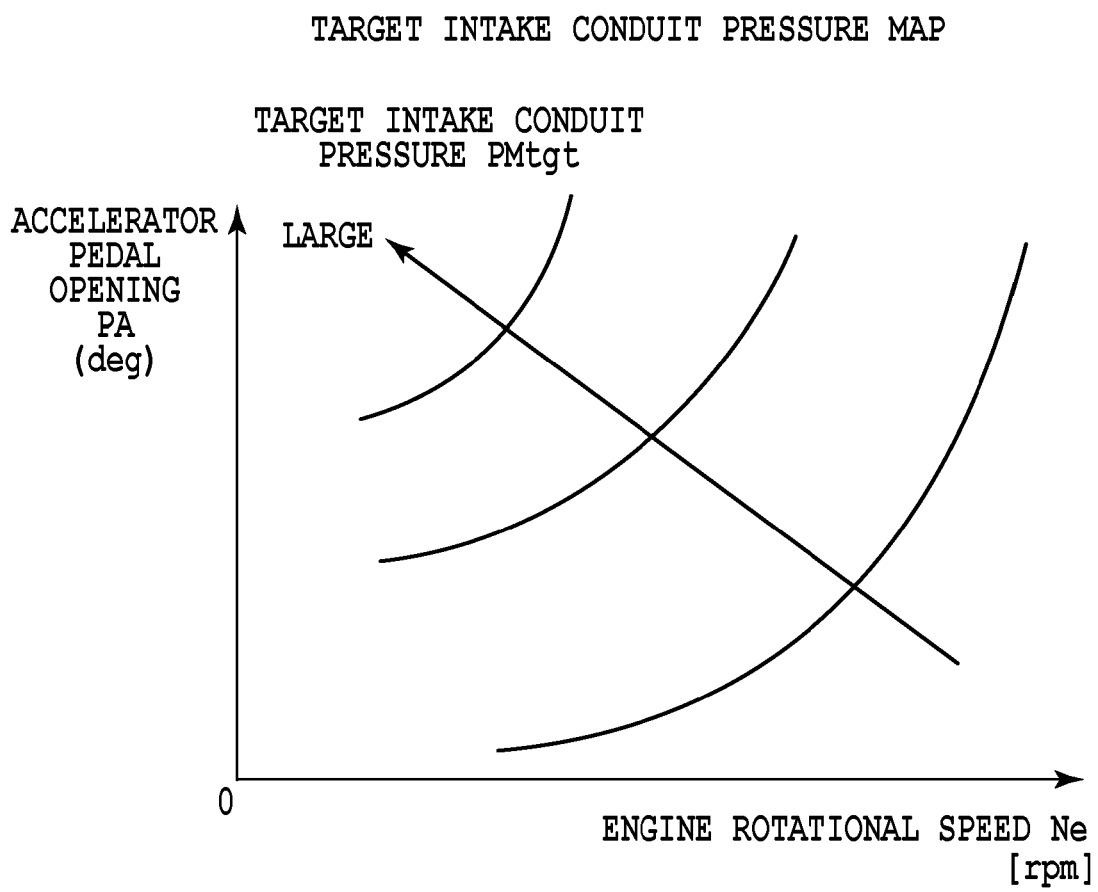
FIG. 3 is a graph illustrating a setting example of a target intake conduit pressure map.

A target intake conduit pressure map illustrated in FIG. 3 is preliminarily produced, which is stored in the ROM of the ECU 50. The target intake conduit pressure map is a map produced by associating an engine rotational speed Ne, an accelerator pedal opening PA, and a target intake conduit pressure PMtgt with each other. As the engine rotational speed Ne is smaller or the accelerator pedal opening PA is larger, the target intake conduit pressure PMtgt is set to be the larger.

Figure 4:
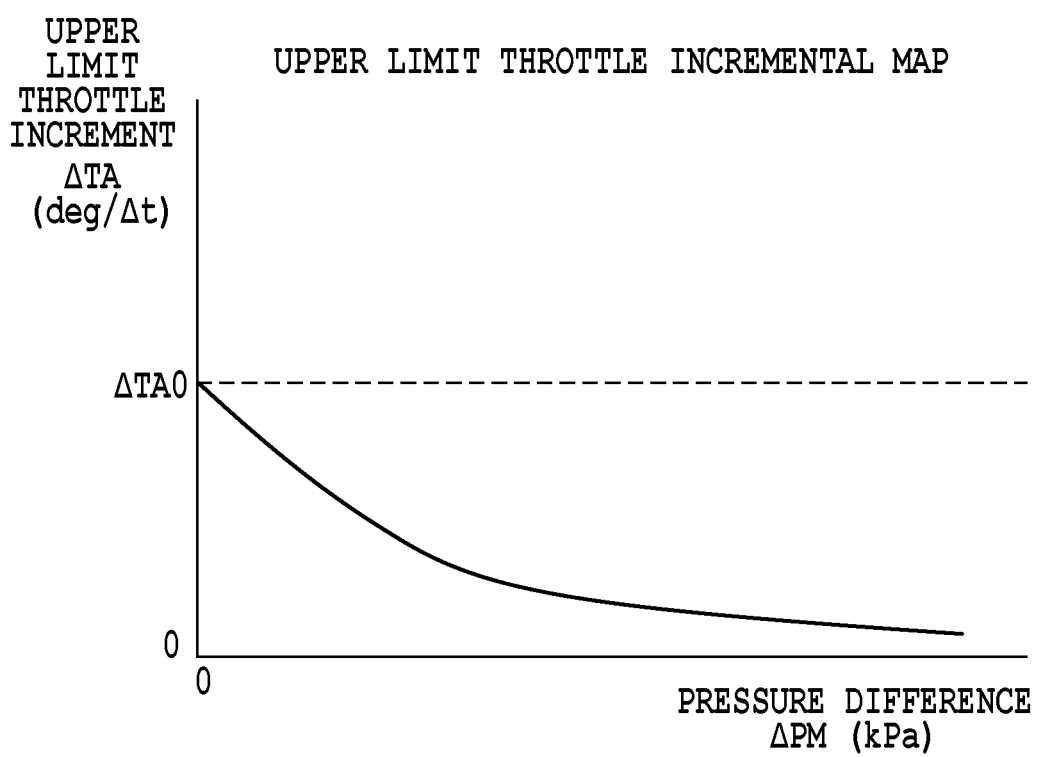
FIG. 4 is a graph illustrating a setting example of an increase/decrease throttle increment map.

An upper limit throttle increment map illustrated in FIG. 4 is preliminarily produced, which is stored in the ROM of the ECU 50. The upper limit throttle increment map is a map produced by associating a pressure difference ΔPM to be described later and an upper limit throttle increment ΔTA to be described later with each other. As the pressure difference ΔPM is larger, the upper limit throttle increment ΔTA is set to be the smaller.

Figure 5:
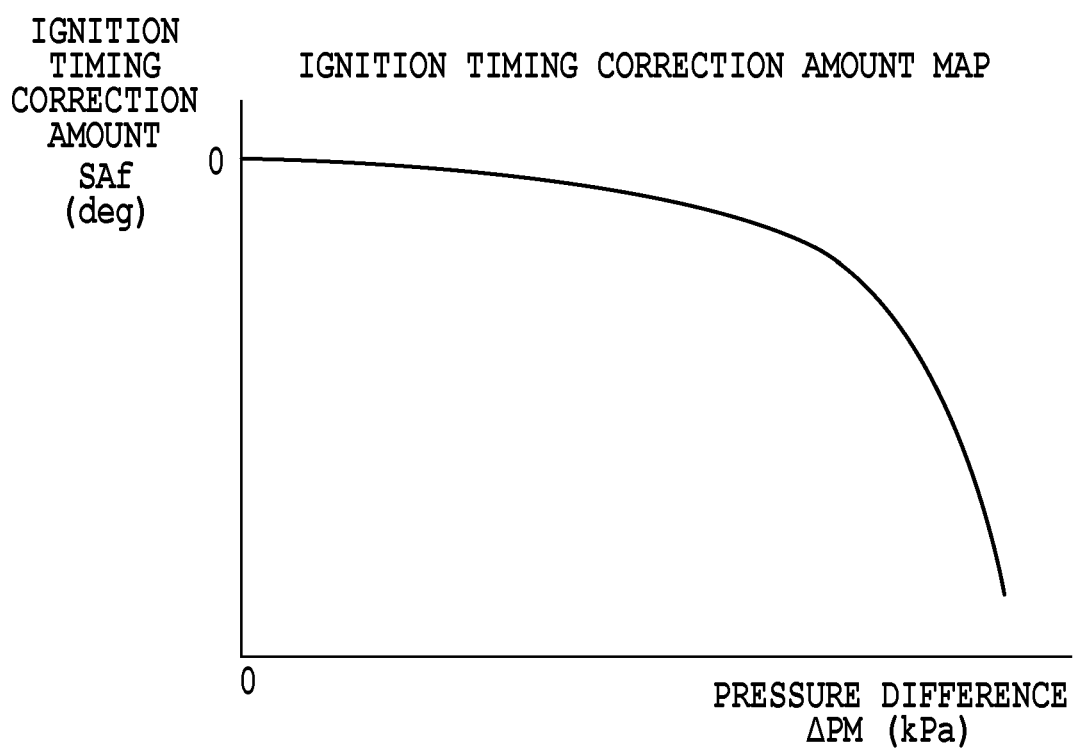
FIG. 5 is a graph illustrating a setting example of an ignition timing correction amount map.

An ignition timing correction amount map illustrated in FIG. 5 is preliminarily produced, which is stored in the ROM of the ECU 50. The ignition timing correction amount map is a map produced by associating a pressure difference ΔPM to be described later and an ignition timing correction amount SAf to be described later with each other. The ignition timing correction amount SAf is added to a basic ignition timing θ0 [BTDC] determined based upon an engine rotational speed Ne and an intake air quantity Ga. As the pressure difference ΔPM is larger, the ignition timing correction amount SAf is set to be the larger to a minus side (that is, a sign thereof is a minus, and an absolute value thereof is set to be the larger). Therefore, as the pressure difference ΔPM is larger, the ignition timing is delayed more largely.

Figure 6:
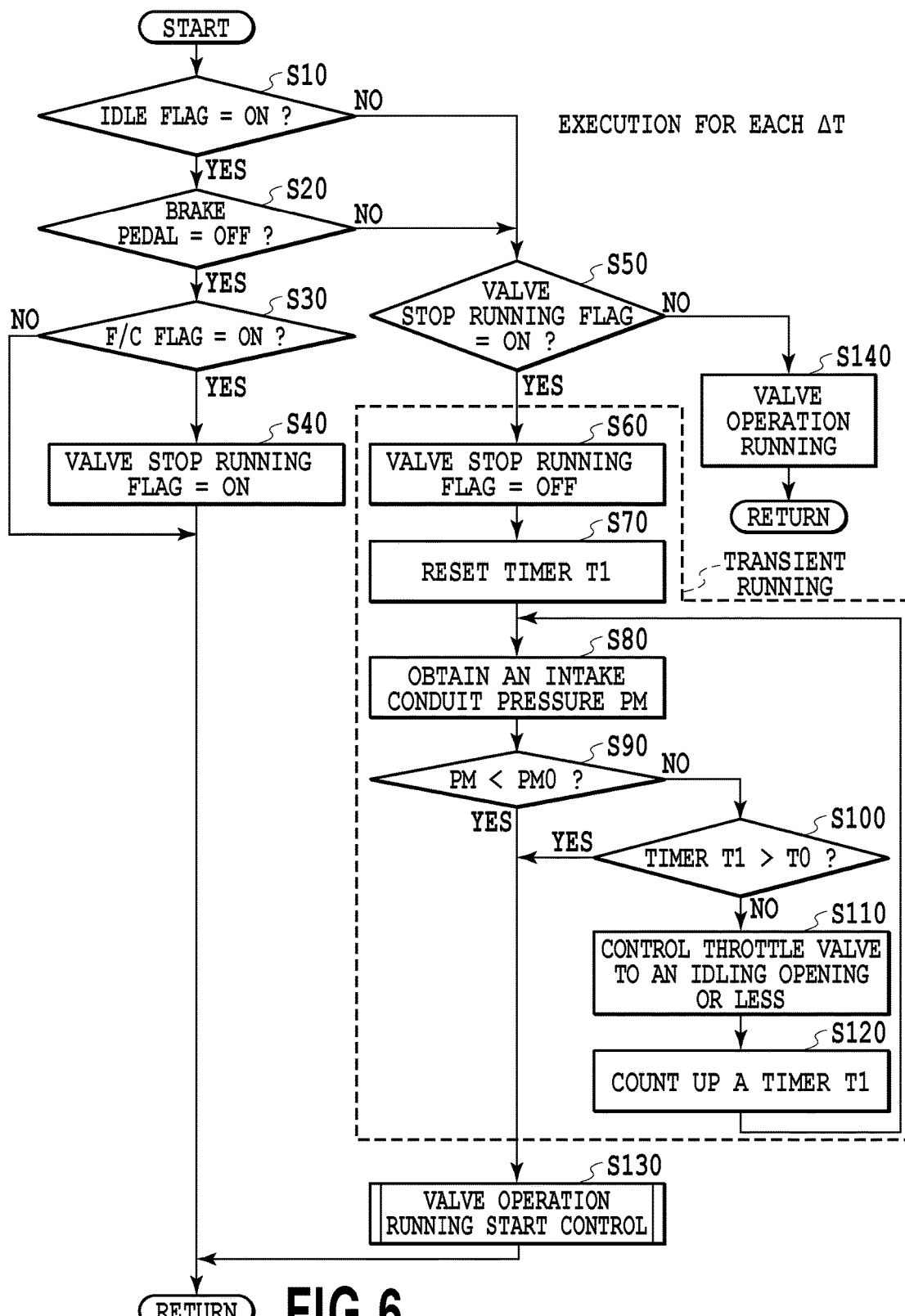
FIG. 6 is a flow chart explaining running mode selection control to be executed in the first embodiment.

FIG. 6 is a flow chart explaining the running mode selection control to be executed in the ECU 50. The running mode selection control is repeatedly executed in a predetermined cycle time Δt on a condition that a not shown power switch is on. In the processing routines in FIG. 6 and FIG. 7, software timers T1, T2 and T3 for executing time operations will be used.

In FIG. 6, step S10 to step S30 correspond to the running mode determination unit 56. First, the ECU 50 determines whether a predetermined idle flag is on (step S10). The idle flag is set to be on in a case where in a separate idle condition determination routine, a condition that an accelerator pedal opening is at a threshold or less (including zero) is satisfied, and is set to be off in a case where the condition is not satisfied. It should be noted that the idle flag may be set to be on in a case where the throttle opening is at a reference value θth corresponding to an idle rotational speed of the engine 14 or less. If yes in step S10 (that is, in a case where the idle flag is on), the process goes to step S20.

In step S20, the ECU 50 determines whether or not the brake pedal 31 is released. In a case where a depressing pressure of the brake pedal 31 is at a threshold or less (including zero), in step S20 a positive determination is made and the process goes to step S30.

In step S30, the ECU 50 determines whether or not a predetermined fuel cut flag is on. The fuel cut flag is set to be on in a case where in a separate fuel cut condition determination routine, a condition (that is, fuel cut condition) that the engine rotational speed is within a predetermined range (for example, 1200 to 1600 rpm)", the accelerator pedal opening is at a threshold or less (including zero)", the engine water temperature is at a predetermined value corresponding to warming-up finish or more and "the SOC of the battery is at a predetermined value or more" is satisfied, and is set to be off in a case where an off operation (step S210) to be described later is executed. If yes in step S30 (that is, in a case where the fuel cut flag is on), the ECU 50 determines that there is the request for valve stop inertial running, and the process goes to step S40. That is, "there is the request for valve stop inertial running" means that the execution condition of the valve stop inertial running is established. If no in step S30, the process returns.

In step S40, the ECU 50 sets a predetermined valve stop running flag to be on. The valve stop running flag is a flag instructing the execution of the valve stop inertial running. The ECU 50 executes the valve stop inertial running in response to the on operation of the valve stop running flag. That is, by the control of the ECU 50, the engaged state of the clutch C1 is maintained to connect the engine 14 and the driving wheels 20, the fuel supply to the engine 14 is stopped (fuel cut), and by the valve stop mechanism of the variable valve mechanism 26, the operations of the intake valves and the exhaust valves of all the cylinders in the engine 14 are stopped in the positions where all of the valves are in the closed state. The throttle valve 24 is controlled to an idle opening or less, that is, a reference value θth corresponding to an idle rotational speed of the engine 14 or less.

On the other hand, if no in step S10 or step S20, that is, if the idle flag is off or the brake pedal is depressed, the ECU 50 next determines whether the valve stop running flag is on (step S50). If yes in step S50, the ECU 50 determines that the cancellation request is made during execution of the valve stop inertial running, and the process goes to the transient running including the processes from step S60 to step S120. That is, "the cancellation request is made during execution of the valve stop inertial running" means that the execution condition of the valve stop inertial running has not been satisfied during execution of the valve stop inertial running.

In step S60, the ECU 50 sets the valve stop running flag to be off. The ECU 50 cancels the valve stop in response to this off operation. That is, the ECU 50 controls the intake valves and the exhaust valves of all the cylinders in the engine 14 to be in an operating state by the valve stop mechanism in the variable valve mechanism 26. As a result, a lift amount for regular running corresponding to a rotational position of the crank shaft acts on the intake valve and the exhaust valve to execute each of intake, compression and exhaust strokes in all the cylinders. The fuel supply and the ignition are stopped.

Next, in step S70, the ECU 50 resets a timer t1 to zero. Next, in step S80, the ECU 50 obtains the present intake conduit pressure PM based upon a detection value of the intake pressure sensor 41. Next in step S90, the ECU 50 determines whether the intake conduit pressure PM is lower than a reference value PM0. If yes, the process goes to step S130. If no (that is, in a case where the intake conduit pressure PM is equal to or higher than the reference value PM0), next the ECU 50 determines whether a count value of the timer T1 exceeds a reference value T0 (step S100). If yes in step S100, that is, if the count value of the timer T1 exceeds the reference value T0, the process goes to step S130, and if no, the process goes to step S110.

In step S110, the ECU 50 controls the throttle valve 24 to an idle opening or less, that is, the reference value θth corresponding to an idle rotational speed of the engine 14 or less. In step S120 the timer T1 is counted up, and the process goes back to step S80.

The transient running including the processes from step S80 to step S120 is repeatedly executed until the positive determination is made in step S90 or step S100 (that is, until the intake conduit pressure PM becomes lower than the reference value PM0 or the count value of the timer T1 exceeds the reference value T0).

In the above transient running, the intake valves and the exhaust valves of all the cylinders in the engine 14 are controlled to be in the operating state. Therefore, the negative pressure generated by the intake stroke and the exhaust stroke of each cylinder acts on the intake passage section between the throttle valve 24 and the intake valve to lower the pressure in the intake passage section. In other words, the intake passage section is suctioned by each cylinder. In a case where the intake conduit pressure PM does not become lower than the reference value PM0 despite the execution of the transient running, the process goes to step S130 on a condition that the count value of the timer T1 (that is, an elapse time from the cancellation request) exceeds the reference value T0.

Figure 7:
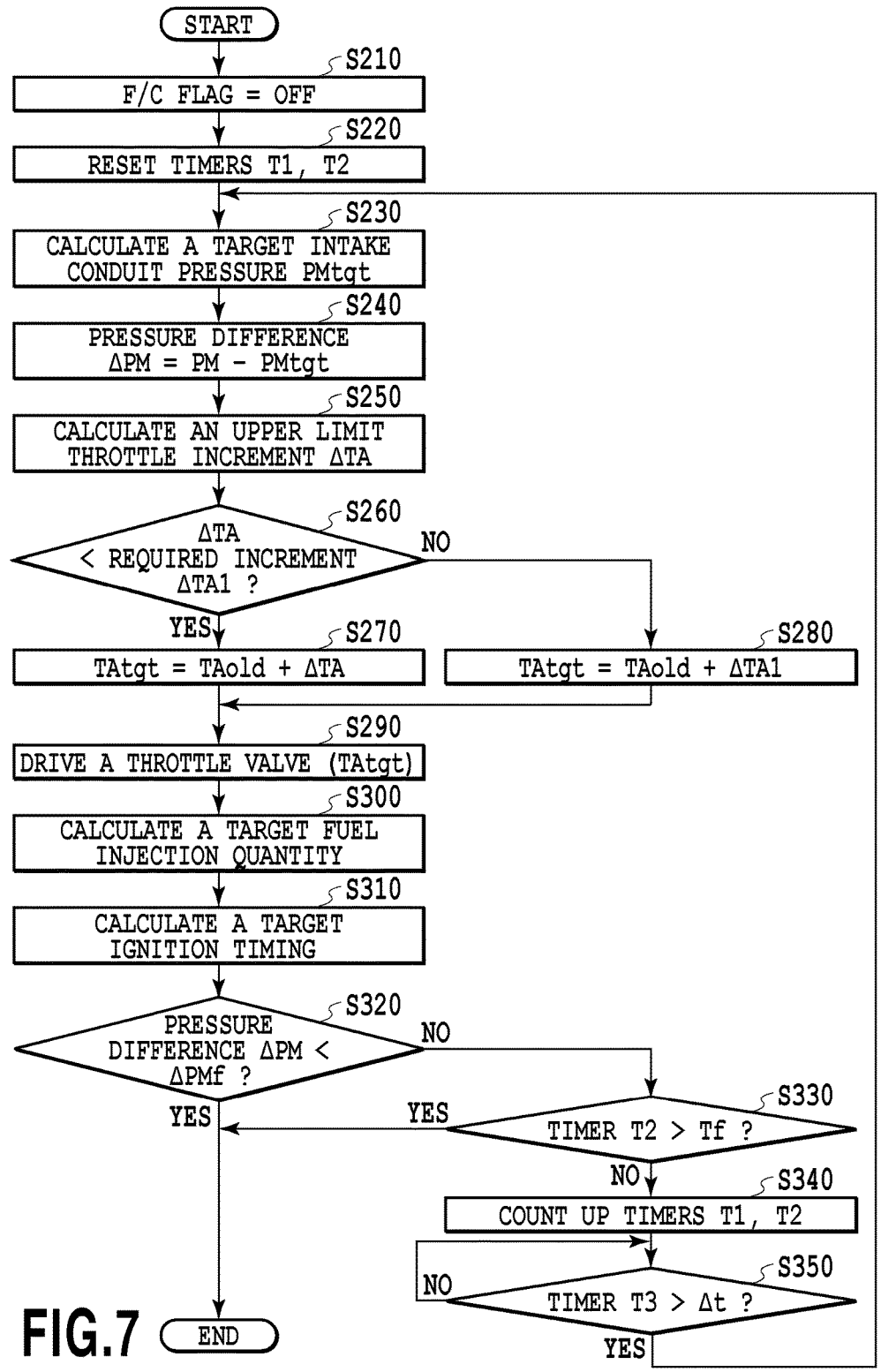
FIG. 7 is a flow chart explaining the details of valve operation running start control in the first embodiment.

After finishing the execution of the transient running, the ECU 50 executes start control of the valve operation running (step S130). The start control of the valve operation running is basically the same as the control of the valve operation running, but differs in a point where the guard processing is executed such that a changing amount per time of an opening of the throttle valve 24 is made to be smaller than a predetermined threshold ΔTA. The start control of the valve operation running is executed according to the processing routine illustrated in FIG. 7. In FIG. 7, first the ECU 50 sets the aforementioned fuel cut flag to be off (step S210) and resets timers T2, T3 to zero (step S220).

Next, the ECU 50 obtains an accelerator pedal opening PA based upon a detection value of the accelerator pedal opening sensor 42, obtains an engine rotational speed Ne based upon a detection value of the crank angle sensor 43 as described above, and refers to the target intake conduit pressure map in FIG. 3 using the accelerator pedal opening PA and the engine rotational speed Ne to calculate a target intake conduit pressure PMtgt (step S230). According to the setting of this map, as the engine rotational speed Ne is the lower or the accelerator pedal opening PA is the higher, the target intake conduit pressure PMtgt is calculated as the higher value.

Next, the ECU 50 obtains an intake conduit pressure PM based upon a detection value of the intake pressure sensor 41, subtracts the target intake conduit pressure PMtgt from the intake conduit pressure PM to calculate a pressure difference ΔPM (step S240). Next, the ECU 50 refers to the upper limit throttle increment map in FIG. 4 by the calculated pressure difference ΔPM to calculate an upper limit increment ΔTA (step S250). The upper limit throttle increment ΔTA is a guard value (that is, an upper limit value) of an increasing amount of the throttle opening per a cycle time Δt.

Next, the ECU 50 determines whether the upper limit throttle increment ΔTA is smaller than a required increment ΔTA1 of the throttle opening per a cycle time Δt determined in accordance with a difference between a throttle opening corresponding to the accelerator pedal opening PA and an actual throttle opening (step S260). The required increment ΔTA1 can be calculated by a predetermined map or function based upon values of an accelerator pedal opening PA of each cycle and an actual throttle opening TA.

If yes in step S260, the ECU 50 adds the upper limit throttle increment ΔTA calculated in step S250 to a previous value TAold of the throttle opening to calculate a target throttle opening TAtgt (step S270).

If no in step S260, the ECU 50 adds the required increment ΔTA1 to the previous value TAold of the throttle opening to calculate a target throttle opening TAtgt (step S280).

The ECU 50 controls the throttle actuator 25 to drive the throttle valve 24 to the target throttle opening TAtgt (step S290). Therefore, if the required increment ΔTA1 is larger than the upper limit throttle increment ΔTA, the upper limit throttle increment ΔTA is instead used for the calculation of the target throttle opening TAtgt, and thereby, the target throttle opening TAtgt is guarded.

Next, the ECU 50 sets a target fuel injection quantity of the fuel injection device 29 (step S300). Specifically, the ECU 50 calculates the target fuel injection quantity based upon, for example, a target throttle opening TAtgt, an engine rotational speed Ne, an intake conduit pressure PM, and an intake air quantity Ga detected by the air flow meter 44.

Next, the ECU 50 sets a target ignition timing of the ignition device 30 (step S310). Specifically, the engine output control unit 51 calculates a basic ignition timing θ0 [BTDC] based upon, for example, an engine rotational speed Ne and an intake air quantity Ga. The ECU 50 refers to the ignition timing correction amount map in FIG. 5 as described above using the present pressure difference ΔPM to calculate an ignition timing correction amount SAf. The ignition timing correction amount SAf delays the ignition timing in comparison with a basic ignition timing θ0 determined based upon an engine rotational speed Ne and an intake air quantity Ga, thus setting the ignition timing to suppress the engine torque at the start of the valve operation running. The ignition timing correction amount SAf has zero or a negative value, and as the pressure difference ΔPM is larger, an absolute value thereof is the larger. The ECU 50 adds the ignition timing correction amount SAf to the basic ignition timing θ0 to calculate a target ignition timing. As the pressure difference ΔPM is larger, the target ignition timing is delayed more largely.

The ECU 50 controls the fuel injection device 29 and the ignition device 30 according to the target fuel injection quantity set in step S300 and the target ignition timing set in step S310 by separate fuel injection control and ignition control to execute the fuel injection and the ignition. At this time, the ECU 50 maintains the engaged state of the clutch C1. With the above configuration, the valve operation running is realized. That is, when the brake pedal is not depressed, the regular acceleration running in which the engine 14 is in the driving state is executed, and when the brake pedal is depressed, the regular deceleration running (engine brake running) in which the engine 14 is in the driven state is executed.

Next, in step S320 the ECU 50 determines whether the pressure difference ΔPM is smaller than a control finish reference value ΔPMf (for example, 10 kPa). The reference value ΔPMf is set to a value small to the extent that even when the running mode transfers to the valve operation running, a rise of the engine torque is allowable. If no (that is, the pressure difference ΔPM is not smaller than the reference value ΔPMf), next the ECU 50 determines whether the count value of the timer T2 exceeds a control finish reference value Tf (step S330).

If no in step S330, the process goes to step S340, wherein the ECU 50 counts up each of the timers T2, T3. Next, the ECU 50 waits until a count value of the timer T3 exceeds a cycle time Δt (step S350), and when the count value of the timer T3 exceeds the cycle time Δt, the processes from step S230 to step S350 are again executed. If yes in step S320 or step S330, the present routine ends, and the process goes back to a main routine in FIG. 6.

In the following cycle, in all of step S10, step S20 and step S50, a negative determination is made, and the valve operation running is executed (step S140). In the valve operation running, basically, a target fuel injection quantity is set similarly to step S300 described above, a target ignition timing is set similarly to step S310, and the ECU 50 controls the fuel injection device 29 and the ignition device 30 according to the set target fuel injection quantity and the set target ignition timing by separate fuel injection control and ignition control to execute the fuel injection and the ignition. The guard processing for an increasing amount of the throttle opening continues to be executed in the valve operation running similarly to step S250 to step S280 described above. However, in the valve operation running, the upper limit throttle increment ΔTA adopts a fixed value ΔTA0 (refer to FIG. 4). The fixed value ΔTA0, for example, is equal to a value of an upper limit throttle increment ΔTA where the pressure difference ΔPM in the upper limit throttle increment map in FIG. 4 as described above is zero, but may be a value different therefrom. As a result, the value of the throttle opening TA transitions as illustrated in a solid line g in FIG. 8. It should be noted that the value of the throttle opening TA transitions as illustrated in a broken line h in FIG. 8 in a case where this guard processing is not executed. In this way, in the valve operation running, the changing amount in the throttle opening TA is made smaller than the changing amount in the throttle opening TA in accordance with an operation amount of the accelerator pedal by a driver. Therefore, a rapid increase of the engine torque (xi) at the start of the valve operation running is suppressed. In the valve operation running, calculation of the ignition timing correction amount SAf based upon the pressure difference ΔPM and correction of the ignition timing using the calculation are not executed. In the valve operation running, the ECU 50 maintains the engaged state of the clutch C1.

Figure 8:
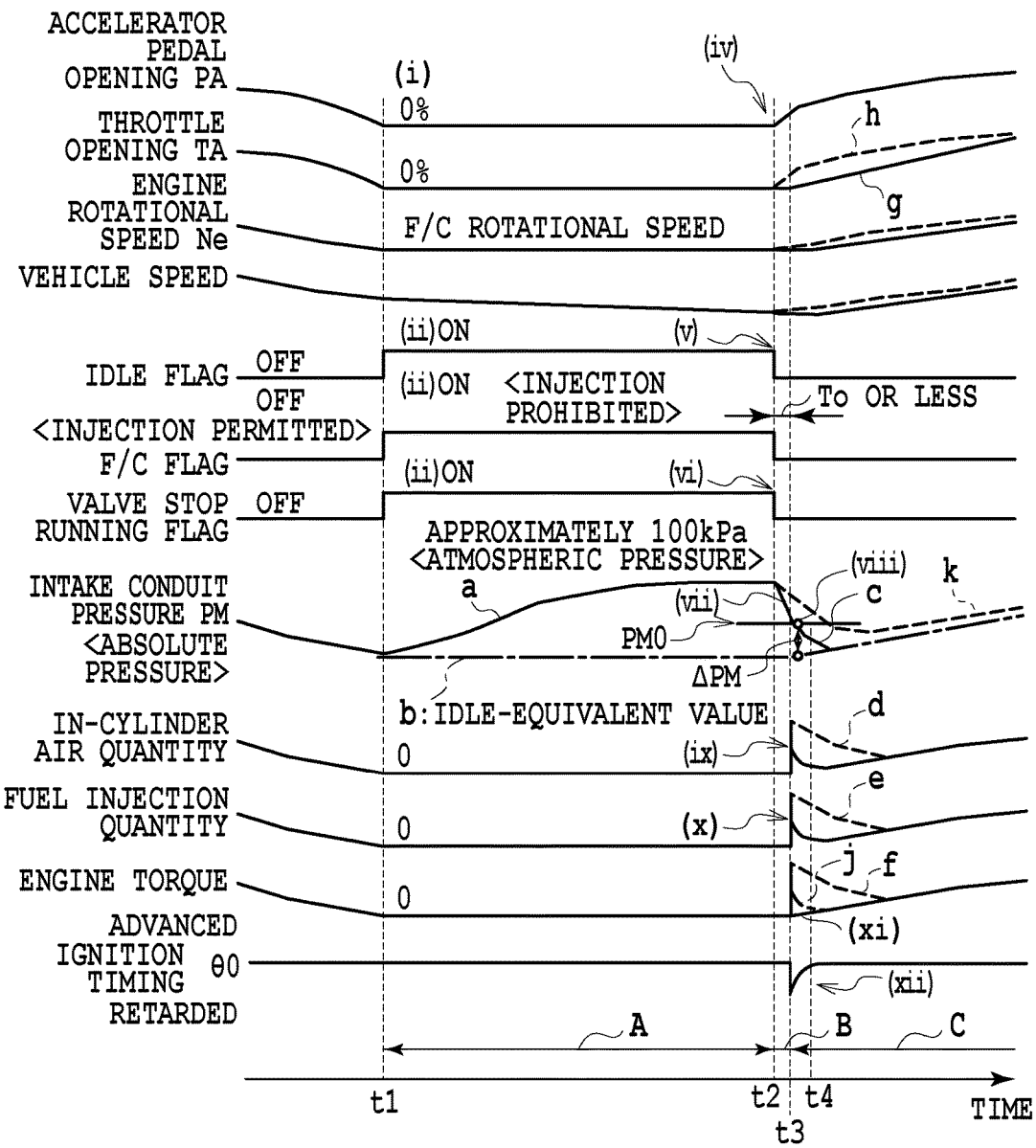
FIG. 8 is a time chart illustrating transition of various parameters in a case of executing the flow charts in FIG. 6 and FIG. 7.

FIG. 8 is a timing chart illustrating an example of an operation according to the first embodiment. Now, when the idle condition and the fuel cut condition are satisfied (i) by releasing the accelerator pedal by a driver, (ii) the idle flag and the fuel cut flag are set to be on. When the brake pedal is being released (S10, S20) at this point, the ECU 50 sets the valve stop inertial running flag to be on (iii), and starts execution of the valve stop inertial running (A) in response thereto (t1, S40). That is, by the control of the ECU 50, the engaged state of the clutch C1 is maintained to connect the engine 14 and the driving wheels 20, the fuel supply to the engine 14 is stopped (fuel cut), and by the variable valve mechanism 26, the operations of the intake valves and the exhaust valves of all the cylinders in the engine 14 are stopped in the positions where all the valves are in the closed state. The idle speed control is cancelled, and the opening of the throttle valve 24 is made to be in the fully closed state. It should be noted that the engine rotational speed at this time is controlled to a predetermined rotational speed at fuel cutting by control of a gearshift ratio of the automatic transmission 16. The vehicle speed is gradually lowered, but since the pumping loss is suppressed, the effect of the engine brake is very small.

During execution of the valve stop inertial running (A), the pressure in the intake passage section between the throttle valve 24 and the intake valve (that is, intake conduit pressure), as indicated at a solid line a in FIG. 8, is increased to an atmospheric pressure (approximately 100 kPa) in a short time after the start of the valve stop inertial running (A) due to air entering from the upstream side through a clearance in the periphery of the throttle valve 24. It should be noted that in a case where the accelerator pedal opening is zero in the valve operation running, the intake conduit pressure is an idle-equivalent value (for example, approximately 30 kPa) lower than an atmospheric pressure as indicated at a dashed line b in FIG. 8.

Next, when the idle condition becomes unsatisfied due to depression of the accelerator pedal by a driver (iv, t2), (ii) the idle flag is set to be off (v). On the other hand, the fuel cut flag is maintained to be in an on-state. An on operation of the accelerator pedal by a driver corresponds to a case where a cancellation request is made during execution of the valve stop inertial running. Therefore, the transient running (B) is executed (t2 to t3). Specifically, the ECU 50 cancels the valve stop (that is, the intake valves and the exhaust valves of all the cylinders in the engine 14 are controlled to be in the operating state by the variable valve mechanism 26) in response to the off operation of the valve stop running flag (vi, S60). Since the engaged state of the clutch C1 is maintained to connect the engine 14 and the driving wheels 20, the intake valve and the exhaust valve are operated during rotation of the crank shaft. As a result, the negative pressure is applied to the intake passage section between the throttle valve 24 and the intake valve to lower the pressure in the intake passage section (vii).

When the intake conduit pressure PM is lower than the reference value PM0 (viii, t3) or when the elapse time from the cancellation request exceeds the reference value T0, the ECU 50 cancels the transient running (B) to transfer to the valve operation running (C, S130, S140, FIG. 7).

Since the valve operation running (C) starts after the transient running (B) is thus executed, the intake conduit pressure PM is made to a relatively smaller value in comparison with a case where the transient running (B) is not executed (broken line k) at the start of the valve operation running (C).

In the valve operation running (C), the fuel injection quantity by the fuel injection device 29 is set to the amount in accordance with the intake conduit pressure PM for avoiding the misfiring and improving emissions. The intake conduit pressure PM is made to a relatively smaller value in comparison with a case where the transient running (B) is not executed, as a result of the execution of the transient running (B) (solid line c). Therefore, a rapid increase of each of an in-cylinder air quantity (ix) and a fuel injection quantity (x) is suppressed at the start of the valve operation running (C) to suppress a rapid increase of the engine torque (xi) at the start of the valve operation running (C).

In addition, a delay of the ignition timing (xii, S310) is executed at the start of the valve operation running (C), and thereby, the engine torque is suppressed. Therefore, also with this configuration, a rapid increase of the engine torque (xi) is suppressed at the start of the valve operation running (C).

In addition, at the start of the valve operation running (C), a changing amount per cycle Δt of the throttle opening TA is guarded within a range of the upper limit throttle increment ΔTA (S250 to S280). As a result, a value of the throttle opening TA transitions as illustrated in a solid line g in FIG. 8. It should be noted that the value of the throttle opening TA in a case where this guard processing is not executed transitions as illustrated in a broken line h in FIG. 8. In this way, at the start of the valve operation running (C), the changing amount of the throttle opening TA is made smaller than the changing amount of the throttle opening TA in accordance with the operation amount of the accelerator pedal by a driver. Therefore, also with this configuration, a rapid increase of the engine torque (xi) is suppressed at the start of the valve operation running (C).

It should be noted that in the conventional apparatus in which application of the negative pressure to the intake passage by the transient running (B) is not made, and the guard of the changing amount of the throttle opening TA immediately after the start of the valve operation running (C) and the delay of the ignition timing both are not executed, when the valve stop inertial running (A) transitions (returns back) to the valve operation running (C), the in-cylinder air quantity rapidly increases as illustrated in a broken line d, the fuel injection quantity rapidly increases as illustrated in a broken line e, and the engine output torque rapidly increases as illustrated in a broken line f, immediately after returning back to the valve operation running.

In addition, in a case (a comparative example which is not the conventional apparatus) in which the application of the negative pressure to the intake passage by the transient running (B) and the guard of the changing amount of the throttle opening TA immediately after the start of the valve operation running (C) are executed but the delay of the ignition timing is not executed, when the valve stop inertial running (A) transitions (returns back) to the valve operation running (C), the engine output torque slightly increases immediately after returning back to the valve operation running (C), as illustrated in a dashed line j. In contrast to this, in the present embodiment a rapid increase in the engine output torque does not occur immediately after returning back to the valve operation running (C), as illustrated in a solid line (xi).

The valve operation running start control (step S130 and FIG. 7) finishes when the pressure difference ΔPM becomes smaller than a control finish reference value ΔPMf (step 320, t4) or when the count value of the timer T2 exceeds a control finish reference value Tf (step S330), and the process goes to the valve operation running (step S140).

As in detail described above, in the present embodiment, the ECU 50 is configured such that in a case where the cancellation request is made during execution of the valve stop inertial running (S10=No or S20=No), the transient control unit 55 executes the transient running (S60 to S120), and thereafter, the second control unit 54 executes the valve operation running (S130, S140 and FIG. 7). As a result of executing the transient running, the negative pressure is supplied to the intake passage section between the throttle valve 24 and the intake valve to lower the pressure in the intake passage section (intake conduit pressure PM). Therefore, at the start of executing the valve operation running, the supply of the fuel of the suppressed amount is executed based upon the suppressed intake conduit pressure PM (S300), thus making it possible to suppress vibrations due to the excessive engine torque while suppressing a possibility of the misfiring.

In addition, in the present embodiment, the transient control unit 55 is configured to execute the transient running until the intake conduit pressure PM is lower than a predetermined reference pressure (reference value PM0) (S90). As a result, it is guaranteed that the intake conduit pressure PM is lower than the reference value PM0 at the start of executing the valve operation running. Therefore, it is possible to suppress vibrations due to the excessive engine torque.

In addition, in the present embodiment, the ECU 50 is configured such that even in a case where the intake conduit pressure PM is not lower than the reference value PM0 during execution of the transient running, when an elapse time (a count value of the timer T1) from the cancellation request exceeds a predetermined reference time (reference value T0), the second control unit 54 executes the valve operation running. Therefore, it is possible to suppress the delay of the execution start of the valve operation running.

In addition, in the present embodiment, the ECU 50 is configured to execute the guard processing such that after the start of the valve operation running, the changing amount per time of the opening of the throttle valve 24 in the engine 14 is made smaller than a predetermined threshold (an upper limit throttle increment ΔTA). As a result, even in a case where a rapid operation of the accelerator pedal by a driver is performed, it is possible to suppress vibrations due to the excessive engine torque.

The order of the control by the first control unit 53 is not limited to the order described in claim 1. That is, "stopping the intake valve and the exhaust valve in the closed state during the rotation of the crank shaft", "stopping the supply of fuel to the engine 14", "controlling the throttle valve 24 of the engine 14 to the idling opening or less", and "controlling the clutch C1 to be in the engaged state" may start at the same time, may start at timings different from each other, or may start in any order.

Likewise, the order of the control by the second control unit 54 is not limited to the order described in claim 1. That is, "operating the intake valve and the exhaust valve during the rotation of the crank shaft" and "supplying fuel to the engine 14" may start at the same time, may start at timings different from each other, or may start in any order.

Likewise, the order of the control by the transient control unit 55 is not limited to the order described in claim 1. That is, "operating the intake valve and the exhaust valve during the rotation of the crank shaft" and "controlling the throttle valve 24 to the idling opening or less" may start at the same time, may start at timings different from each other, or may start in any order.

Next, an explanation will be made of a second embodiment of the present invention. The second embodiment is characterized in that a valve timing variable mechanism and a lift variable mechanism in the variable valve mechanism 26 are used to control an opening timing and a closing timing of each of an intake valve and an exhaust valve.

Figure 9:
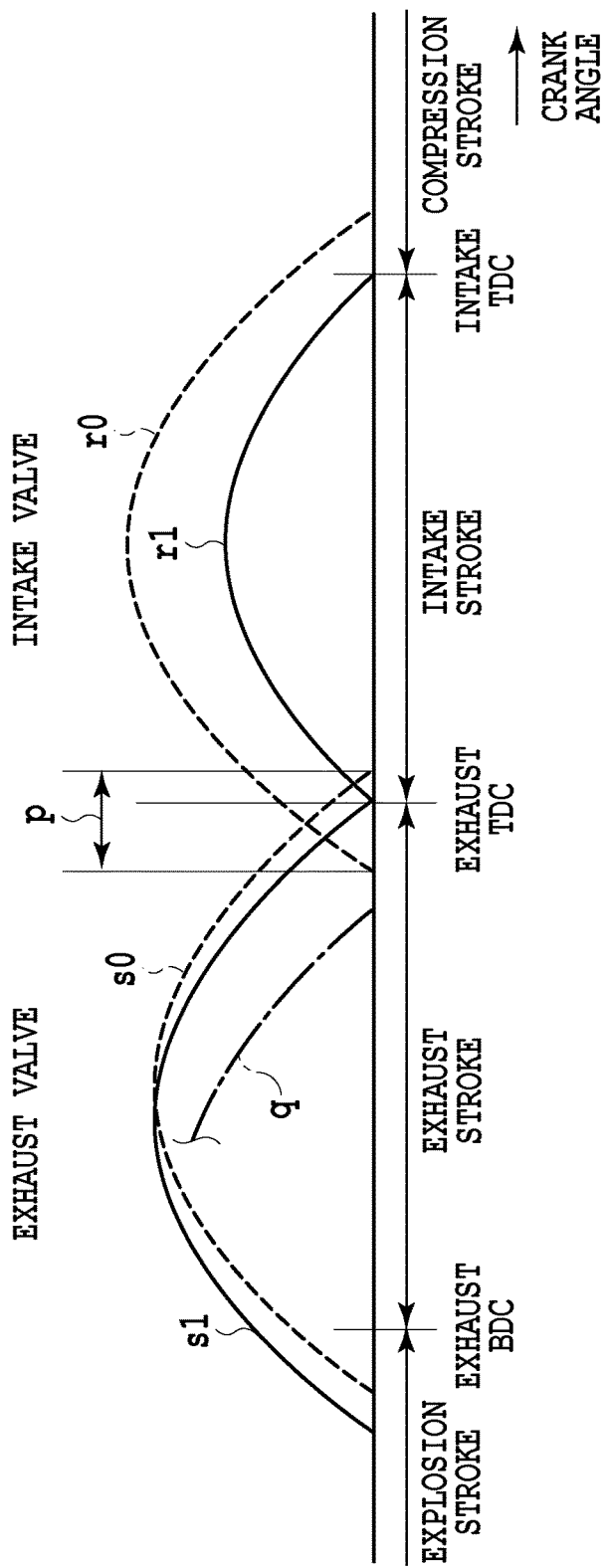
FIG. 9 is a timing chart illustrating operations of an intake valve and an exhaust valve in a case where a pressure reduction mode valve operation is executed and in a case of a regular drive.

As illustrated in FIG. 9, when there exists a valve overlap period p in which the intake valve and the exhaust valve both open, there is a possibility that a reduction in pressure in the intake passage section by the operation of each of the intake valve and the exhaust valve is not effectively executed. This is because even when the reduction in pressure in the intake passage section by the operation of each of the intake valve and the exhaust valve is executed, gases in the exhaust passage flow into the intake passage in the valve overlap period p. On the other hand, when a closing timing of the exhaust valve is earlier than an exhaust top dead center TDC as indicated in a dashed line q, compression of in-cylinder gases by a piston is made after the exhaust valve is closed. Therefore, when the intake valve is next opened, the in-cylinder gas is ejected into the intake passage, thereby possibly interrupting the pressure reduction in the intake passage section. The second embodiment has an object of suppressing the increase in the intake conduit pressure of these modes. The mechanical configuration of the second embodiment is the same as that of the first embodiment, and therefore, the explanation is omitted.

Figure 10:
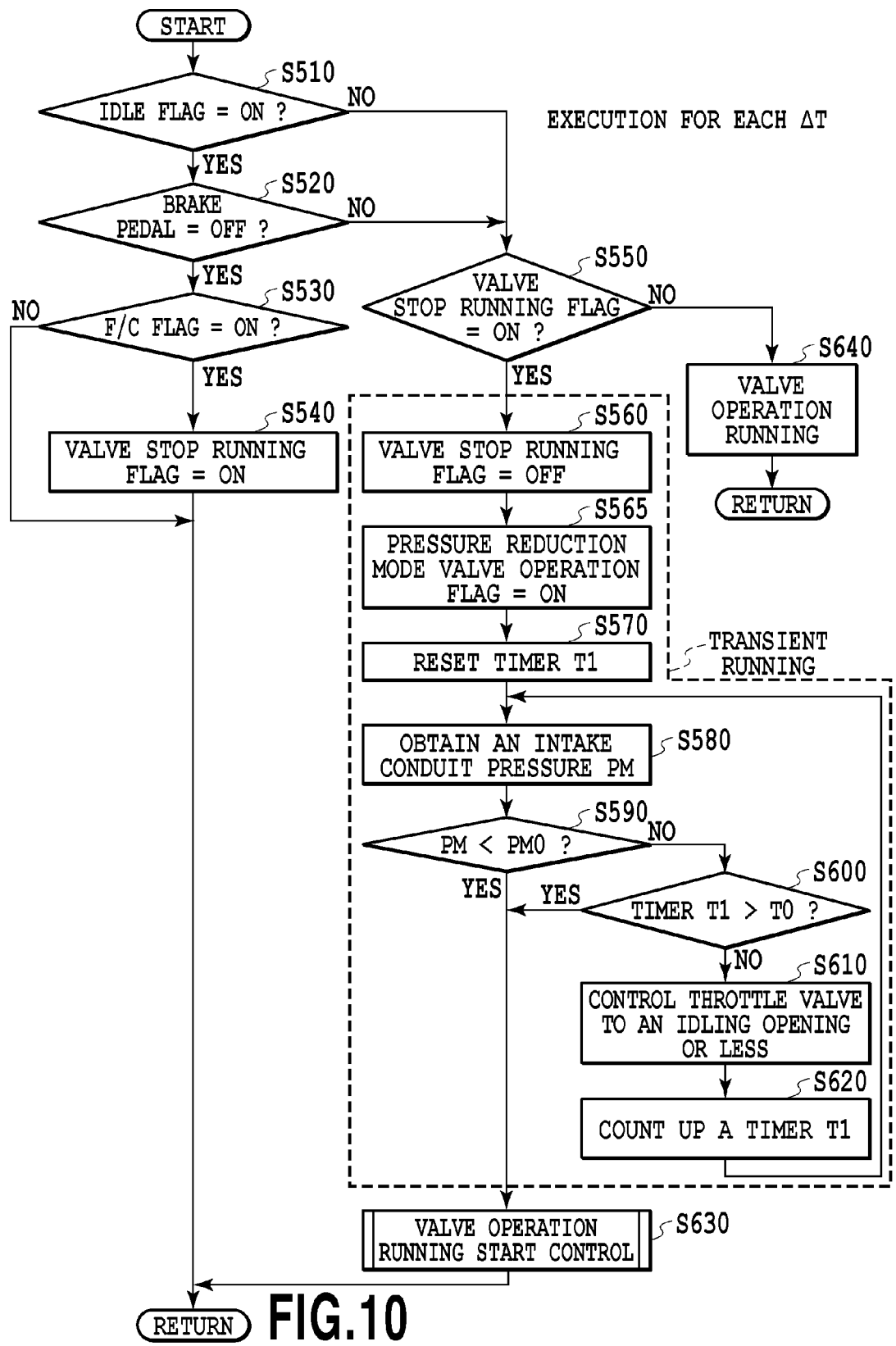
FIG. 10 is a flow chart explaining running mode selection control to be executed in a second embodiment.
Figure 11:
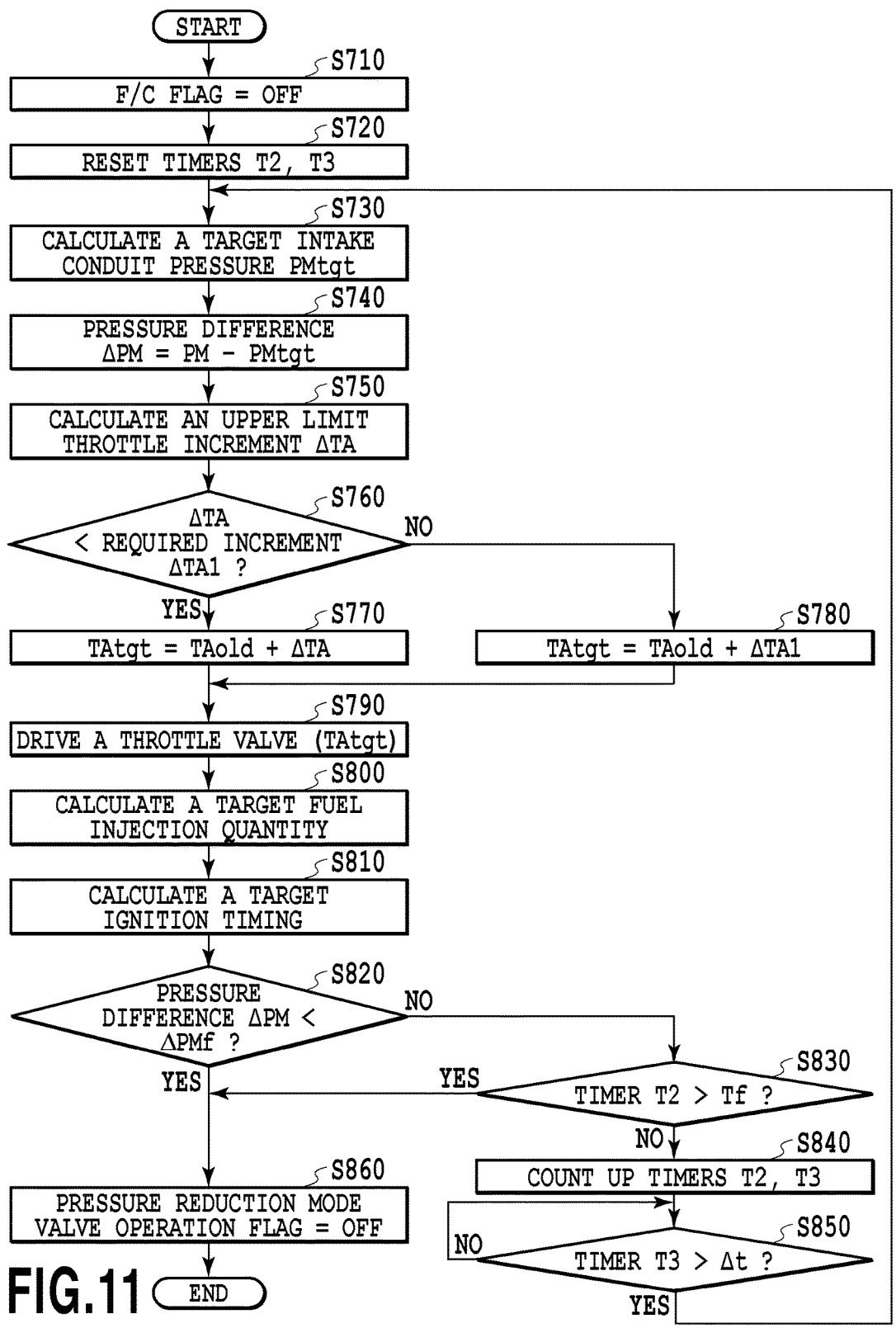
FIG. 11 is a flow chart explaining the details of valve operation running start control in the second embodiment.

FIG. 10 and FIG. 11 are flow charts explaining running mode selection control to be executed in the ECU 50 according to the second embodiment. The control of the second embodiment is basically the same as the control (FIG. 6 and FIG. 7) of the first embodiment other than a point where control (S565, S860) of the valve timing variable mechanism and the lift variable mechanism in the variable valve mechanism 26 are added.

Processes from step S510 to step S560 in FIG. 10 are the same as those from step S10 to step S60 (FIG. 6) in the first embodiment. In step S560 a predetermined valve stop running flag is set to be on, and when the ECU 50 starts execution of the valve stop inertial running in response thereto, the ECU 50 sets a pressure reduction mode operation flag to be on in parallel thereto (step S565). In response to the on operation of the pressure reduction mode operation flag, the ECU 50 uses the valve timing variable mechanism and the lift variable mechanism in the variable valve mechanism 26 to execute a pressure reduction mode operation of each of the intake valve and the exhaust valve. The pressure reduction mode operation includes the following events of (1) to (4):
(1) Prohibiting a valve overlap of an intake valve and an exhaust valve, or making it smaller than an overlap amount (period or crank angle section) during execution of the valve operation drive.

(2) Making the opening timing of the intake valve at an exhaust top dead center (TDC) or closer to the exhaust top dead center (TDC) in comparison with the opening timing of the intake valve during execution of the valve operation drive.
(3) Making the closing timing of the intake valve at an exhaust bottom dead center (BDC) or closer to the exhaust bottom dead center (BDC) in comparison with the closing timing of the intake valve during execution of the valve operation drive.
(4) Making the closing timing of the exhaust valve at an exhaust top dead center (TDC) or closer to the exhaust top dead center (TDC) in comparison with the closing timing of the exhaust valve during execution of the valve operation drive.

As illustrated in FIG. 9, in a case where the above pressure reduction mode valve operation is executed, the operation timing of the intake valve is, for example, as indicated in a solid line r1, and the operation timing of the exhaust valve is, for example, as indicated in a solid line s1. In contrast thereto, the opening/closing timing (determined based upon a required load and an engine rotational speed Ne) in a regular drive, that is, during execution of the valve operation drive, is, for example, as indicated in a broken line r0 for the intake valve, and as indicated in a broken line s0 for the exhaust valve. The valve overlap p existing in the regular drive does not exist in the pressure reduction mode valve operation exemplified in FIG. 9.

The processes from step S570 to step S620, and in step S640 are the same as those from step S70 to step S140 (FIG. 6) in the first embodiment.

The valve operation running start control in step S630 is executed according to a processing routine illustrated in FIG. 11. The processes from step S710 to step S850 in FIG. 11 are the same as those from step S210 to step S350 (FIG. 7) in the first embodiment. In step S860, the ECU 50 sets the pressure reduction mode valve operation flag to be off. In response to the off operation of the pressure reduction mode valve operation flag, the ECU 50 controls the intake valve and the exhaust valve in the opening/closing timings (determined based upon a required load and an engine rotational speed Ne) during execution of a regular drive, that is, valve operation drive. It should be noted that when the pressure reduction mode valve operation returns back to the regular drive, the transition process of suppressing a rapid change in valve timing may be executed.

As in detail described above, in the second embodiment, the ECU 50 executes the processes from the above (1) to (4) during execution of the transient running. Therefore, it is possible to suppress an increase in pressure (intake conduit negative pressure PM) in the intake passage section between the throttle valve 24 and the intake valve during execution of the transient running.

It should be noted that only a part (that is, only any one or more) of the processes from the above (1) to (4) may be executed, and it is possible to obtain a desired effect correspondingly.

In each of the aforementioned embodiments, the clutch C1 configuring a part of the automatic transmission 16 is exemplified as a clutch, but the clutch C1 may be provided independently from the automatic transmission 16. For example, in a case where the automatic transmission 16 is a belt type continuously variable transmission, an example of the clutch in the present invention may include a well-known forward/backward switching device provided in a vehicle together with a continuously variable transmission independently from the continuously variable transmission or an engaging device included in the forward/backward switching device.

The clutch C1, by controlling the engaging force in a non-step manner (torque capacity control), may realize a fully engaged state of transmitting the entire power from the engine to the driving wheels 20, a disengaged state of not transmitting the power from the engine 14 to the driving wheels 20 at all, and besides, a partially engaged state, that is, an engaged state of transmitting only a part of the power from the engine 14 to the driving wheels 20 by the sliding of the driving member and the driven member in the clutch C1 each other. By this partially engaged state also, it is possible to execute the valve stop inertial running and the valve operation running in the present invention. In addition, the vibration due to the excessive engine torque may be further suppressed by realizing this partial engaged state immediately after the transient running transitions to the valve operation running.

The embodiment of the present invention is not limited to each of the aforementioned embodiments and modifications, and the present invention can include all modifications and applications contained in the subject of the present invention defined by the claims and its equivalents. Therefore, the present invention should be not interpreted in a limiting manner, and can be applied also to any other technologies within the scope in the subject of the present invention.

What is claimed is:

1. A control apparatus for a vehicle configured to control a vehicle comprising a valve operation mechanism that can stop an intake valve and an exhaust valve in an engine in a closed state during rotation of an output shaft in the engine, and a clutch that can switch a power transmission route between the engine and a driving wheel between an engaged state and a disengaged state, comprising:
    a first control unit configured to execute a valve stop inertial running including stopping the intake valve and the exhaust valve in the closed state during the rotation of the output shaft, stopping supply of fuel to the engine, controlling a throttle valve of the engine to an idling opening or less, and setting the clutch in the engaged state to drive pistons of the engine by a rotational force from the driving wheel through the output shaft;
    a second control unit configured to execute a valve operation running including operating the intake valve and the exhaust valve during the rotation of the output shaft, and supplying the fuel to the engine; and
    a transient control unit configured to execute a transient running including operating the intake valve and the exhaust valve during the rotation of the output shaft, and controlling the throttle valve to the idling opening or less, thereby supplying a negative pressure to an intake passage section between the throttle valve and the intake valve, wherein the control apparatus is further configured so that in a case where a request for valve stop inertial running is made, the first control unit executes the valve stop inertial running, and in a case where a cancellation request is made during execution of the valve stop inertial running, the transient control unit executes the transient running, and thereafter, the second control unit executes the valve operation running.

2. The control apparatus for a vehicle according to claim 1, wherein
    the transient control unit is further configured to execute the transient running until the pressure in the intake passage section becomes lower than a predetermined reference pressure.

3. The control apparatus for a vehicle according to claim 2, wherein
    the control apparatus is further configured so that even in a case where the pressure in the intake passage section is not lower than the reference pressure during execution of the transient running, when an elapse time from the cancellation request exceeds a predetermined reference time, the second control unit executes the valve operation running.

4. The control apparatus for a vehicle according to claim 1, wherein
    the valve operation mechanism is configured to control operation timings of the intake valve and the exhaust valve, and
    the control apparatus is further configured to, during execution of the transient running, execute at least any of:
    (1) making a valve overlap amount, in which the intake valve and the exhaust valve are both open, to be smaller than a valve overlap amount determined based upon a required load and an engine rotational speed;
    (2) making an opening timing of the intake valve closer to an exhaust top dead center as compared with an opening timing of the intake valve determined based upon a required load and an engine rotational speed;
    (3) making a closing timing of the intake valve closer to an exhaust bottom dead center as compared with a closing timing of the intake valve determined based upon a required load and an engine rotational speed; and
    (4) making a closing timing of the exhaust valve closer to an exhaust top dead center as compared with a closing timing of the exhaust valve determined based upon a required load and an engine rotational speed.

5. The control apparatus for a vehicle according to claim 1, wherein
    the control apparatus is further configured to execute guard processing such that a changing amount per time of an opening of the throttle valve in the engine is made smaller than a predetermined threshold after starting the valve operation running.

* * * * *